United States Patent [19]

Meehan

[11] Patent Number: 4,500,746

[45] Date of Patent: Feb. 19, 1985

[54] SELF-CONTAINED ELECTRICAL WIRING DEVICE

[75] Inventor: James E. Meehan, Levittown, N.Y.

[73] Assignee: Slater Electric Inc., Glen Cove, N.Y.

[21] Appl. No.: 417,082

[22] Filed: Sep. 13, 1982

Related U.S. Application Data

[63] Continuation of Ser. No. 130,224, Mar. 14, 1980, abandoned.

[51] Int. Cl.³ .............................................. H02G 3/08

[52] U.S. Cl. ...................................... 174/48; 174/53; 174/58; 174/66; 339/99 R

[58] Field of Search ...................... 174/53, 58, 48, 66, 174/52 R; 220/3.2–3.94, 4 R; 339/99 R; 248/27.1

[56] References Cited

U.S. PATENT DOCUMENTS

| | | | |
|---|---|---|---|
| 964,741 | 7/1910 | Beghtol . | |
| 1,013,681 | 1/1912 | Osland et al. . | |
| 1,627,631 | 5/1927 | Chizlett . | |
| 2,110,513 | 3/1938 | Toelke . | |
| 2,320,400 | 6/1943 | Bedell | 220/3.6 |
| 2,717,365 | 9/1955 | Greenbaum . | |
| 2,723,327 | 11/1955 | Gilbert . | |
| 2,987,690 | 6/1961 | Marbais | 220/3.94 X |
| 3,022,485 | 2/1962 | Buchanan . | |
| 3,090,587 | 5/1963 | Peterson . | |
| 3,432,611 | 3/1969 | Gaines et al. | 174/66 |
| 3,662,085 | 5/1972 | Robinson et al. . | |
| 3,723,943 | 3/1973 | Hotze | 357/74 X |
| 3,723,948 | 3/1973 | Wyatt . | |
| 3,860,319 | 1/1975 | Slater . | |
| 3,860,739 | 1/1975 | Kloth et al. | 174/48 |
| 3,908,235 | 9/1975 | Telliard et al. | 174/66 X |
| 3,966,152 | 6/1976 | Bromberg | 220/3.9 X |
| 4,019,647 | 4/1977 | Arnold | 220/3.6 X |
| 4,297,525 | 10/1981 | Bowden | 174/58 |

*Primary Examiner*—A. T. Grimley
*Assistant Examiner*—D. A. Tone
*Attorney, Agent, or Firm*—Morgan, Finnegan, Pine, Foley & Lee

[57] ABSTRACT

A self-contained or boxless electrical wiring device, such as a receptacle or switch, includes a body adapted to be mounted in an aperture in the wall of a building or a mobile home. The body houses wire grasping terminals for connection with the wires of electrical cable without requiring the stripping of insulation. Interior partitions support terminal members into which the insulated cable conductors are forced for terminating the device. The partitions are integrally formed with the front face and side walls of the body in a configuration which is readily molded. Mounting members, in the form of mounting pawls or crimp mounting members are formed at each end to permit installation near wall studs. The body is closed by a back cover having projections for driving the wires into the terminals, the cover being releasably secured via legs which engage the sidewalls.

17 Claims, 26 Drawing Figures

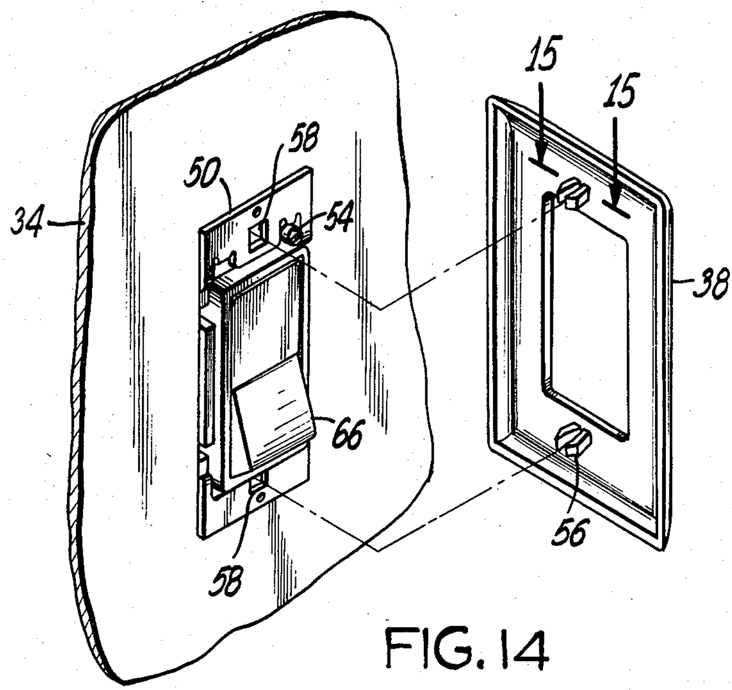
FIG. 14
FIG. 15
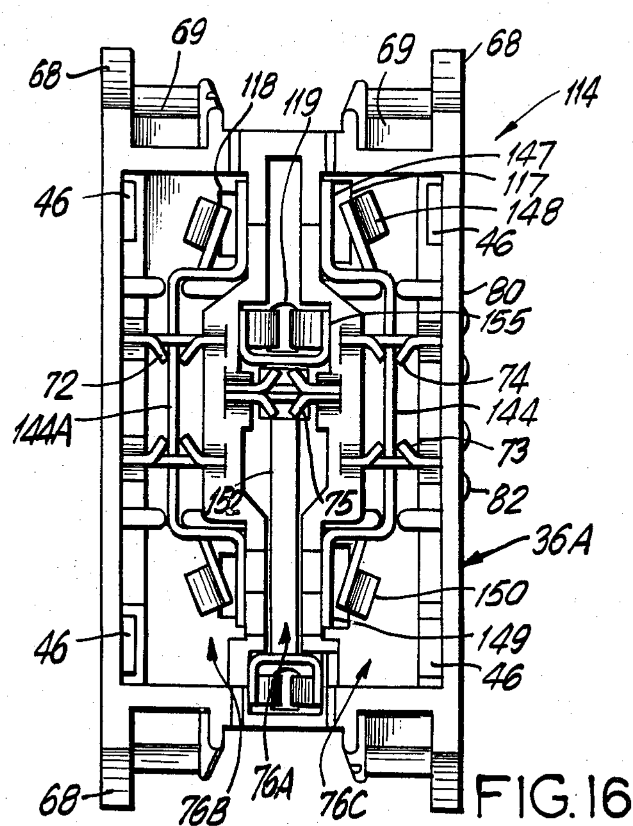
FIG. 16
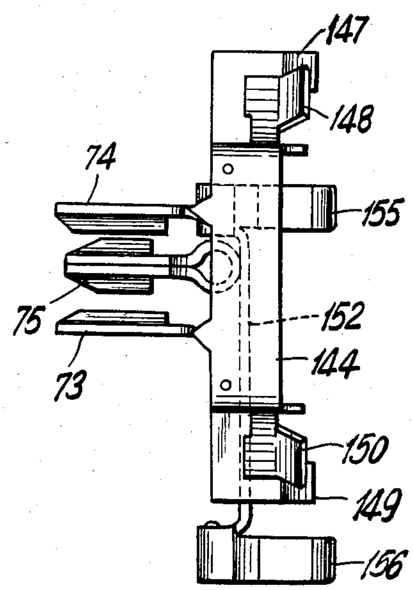
FIG. 16A

SELF-CONTAINED ELECTRICAL WIRING DEVICE

This is a continuation, of application Ser. No. 130,224 filed Mar. 14, 1980 now abandoned.

BACKGROUND OF THE INVENTION

This invention relates to electrical components and, more particularly, to self-contained or boxless electrical wiring devices, such as switches and receptacles, which may be operatively coupled to an electrical cable and installed without the use of an outlet box.

Electrical components, particularly wiring devices such as switches and receptacles, may be produced in a variety of forms. Often, these components are secured within an outlet box that is mounted within an aperture of a wall of a building or a mobile home. More recently, the self-contained or boxless form of wiring device is being utilized in mobile homes and prefabricated buildings since this form of wiring device does not employ an outlet box and can, therefore, be mounted within a confined space too small to accommodate an outlet box.

One such self-contained wiring device, including both the receptacle form and the switch form, is shown in the U.S. Pat. No. 3,860,319 which issued in the name of Slater on Jan. 14, 1975. Details on the construction of electric terminals for such wiring devices are shown in the U.S. Pat. No. 3,860,739 which issued in the name of Kloth et al. on Jan. 14, 1975. A description of the mechanism and electric contacts for a switch appears in the British Patent No. 940,278 which was published in the name of Lowe et al. on Oct. 30, 1963. The mounting of such wiring devices by means of pawls within an aperture in a wall is disclosed in the U.S. Pat. No. 3,957,336 which issued in the name of Bromberg on May 18, 1976.

The physical structure of the foregoing electrical components is generally complex with the metal terminals and contacts, and their supporting structures of moldable plastic material, having intricate shapes. The unitary enclosure, referred to as the body of the component, including the internal terminal support and wire guiding structure, is generally formed by a molding operation. The terminals and contacts are generally formed by stamping and bending operations, and are then inserted within the supporting structures of the body to complete the assembly of the component.

A problem arises in that the foregoing intricate shapes of the various parts of the self-contained receptables and switches have precluded a direct procedure for their mechanical design with the result that much experimentation is required to produce a self-contained wiring device that can be assembled efficiently. Thus, it is desirable to form the body and its interior supporting structures in a shape that is readily molded without the wastage of excess material and without the need for side draws. In addition, it is desirable to form the body with slots and similar physical features which permit the attachment of both metal and nonmetal components, such as mounting plates, electric terminals, and decorative panels which have corresponding physical features, without the need for excessive fastening devices such as screws and rivets.

A further problem arises in that in the structuring of the wiring device for a facile assembly, the structure of the device should accommodate a mounting feature, such as a pawl assembly, which permits the mounting of the wiring device adjacent a wall stud. In addition, it is desirable to incorporate a single structural member, such as a cover plate, which can be used interchangeably for both switches and receptacles, and thereby reduce the number of different parts required for the assembly of self-contained wiring devices. With respect to the cover plate, it is noted that such a plate should be configured for easy removal to permit attachment of electric cable to the internal terminals, and should readily accommodate cables at one or both ends of the wiring device. While presently available wiring devices may have one or more of the foregoing features, it appears that their configurations do not permit the simultaneous presence of all of these features. As a result, inconveniences are experienced during the manufacturing and/or the installation process.

Accordingly, it is an object of the present invention to provide new and improved self-contained wiring devices including either an electrical switch mechanism or an electrical outlet receptacle. It is also an object of the invention to provide self-contained wiring devices made from moldable parts for relatively simple and low cost fabrication.

It is another object of the invention to provide new and improved self-contained wiring devices having mounting means which permit quick and easy mounting within a wall opening, without the use of nails or other like fasteners. Such mounting means may also be adapted to permit attachment within the wall opening even when the body of the device abuts a support stud for the wall It is a further object of the invention to provide new and improved self-contained wiring devices utilizing a snap-fit back cover which has the same construction for receptacles as for switches. The back cover is also capable of universal attachment—i.e., it can be rotated 180° and still fit the device body. Furthermore, the back cover is adapted to be securely attached to the body, yet can be relatively easily disengaged when desired, and facilitates good contact between the cable conductors and the electrical terminals.

It is still another object of the invention to provide new and improved self-contained wiring devices which can easily be adapted to conform to virtually any desired wiring arrangement. The invention also contemplates new and improved contact/terminal structures which interfit with the wiring device body to minimize the amount of metal required to fabricate the contacts. For switch mechanisms, the device provides a new and improved switch wherein the contact members are closed in a wiping action and the switch actuator cannot be disabled by pressure applied directly to the front of device.

SUMMARY OF THE INVENTION

The foregoing problems are overcome and other advantages are provided by a self-contained wiring device fabricated in accordance with the invention by the provision of molded bodies for both switches and receptacles which share a common cover plate, a common set of side walls, and interior partitions of similar configurations. To facilitate installation, as in the wall of a mobile home, the ends of the body are tapered for insertion within an aperture in the wall. To further facilitate the installation in the situation wherein a plurality of the wiring devices are to be installed side by side, the edges of the faces of the bodies are recessed inwardly to permit engagement of an alignment tool with the respective side walls for holding the devices in their respective positions. The entire back side of a body is open to permit access to terminals for connection with the wires of an electric cable, the back side being closed by a single cover plate which is common to both switches and receptacle after connection of the wires to the terminals. Upstanding legs from the cover plate extend interiorly of the side walls of a body, and have tabs thereon for releasably latching the cover plate to the side walls, whereby the wiring device may readily be opened for connection to electrical cable.

The body of the receptacle is distinguishable from the body of the switch in that the face of the former is apertured to receive an electric plug while the face of the latter is configured to support a rocker-arm actuator. In both the switch and the receptacle, the terminals are fabricated from stamped metal plates wherein various legs of the stampings are bent and twisted to form members which mate with support structures in the body, and to form arms which engage the electric wires. The arms are provided with wings having cutting edges, the wings being bent towards each other to form opposed edges which cut through the insulation of an electric wire for contacting the conductor thereof. The terminals are positioned between partitions which, in cooperation with posts on the cover plate, guide the wires between the cutting edges.

Mounting pawls are secured adjacent wall means formed integrally with the bodies of both the switches and the receptacles. The wall means permit translation of the pawls while restricting their rotation to a minimum rotation of approximately 90° about their respective axes to facilitate the mounting and the withdrawal of the wiring device at a location adjacent to a wall stud.

A feature in the switch is the use of a resilient fulcrum in combination with an L-shaped contact arm to provide a wiping action to the switch contacts, the resilient fulcrum also serving as a spring which provides a snap action to a rocker-arm actuator of the switch. The actuator includes an integrally formed decorative panel which covers the face of the switch body. The face of the body supports a pivot of the actuator and thereby protects the switch mechanism from external forces that may be applied to the front of the switch by a person operating the switch.

It will be understood that the foregoing general description as well as the following detailed description are exemplary and explanatory of the invention, but are not intended to be restrictive thereof. Accordingly, the accompanying drawings, referred to herein and constituting a part hereof, illustrate preferred embodiments of the invention and, together with the detailed description, serve to explain the principles of the invention.

BRIEF DESCRIPTION OF THE DRAWINGS

The aforementioned features and other aspects of the invention are explained in the following description taken in connection with the accompanying drawings, wherein:

FIG. 14 is a partially exploded view of the switch body of FIG. 1, showing the emplacement of the face plate about the actuator of the switch.

FIG. 15 is a sectional view of the face plate mounting tabs taken along lines 15—15 of FIG. 14.

FIG. 16 is a plan view, similar to that of FIG. 2, of the open back of the receptacle of FIG. 4.

FIG. 16A is a side elevation of terminals in the receptacle of FIG. 16, the body portion of the receptacle being deleted to show the terminals clearly.

DESCRIPTION OF THE PREFERRED EMBODIMENT

Figure 1:
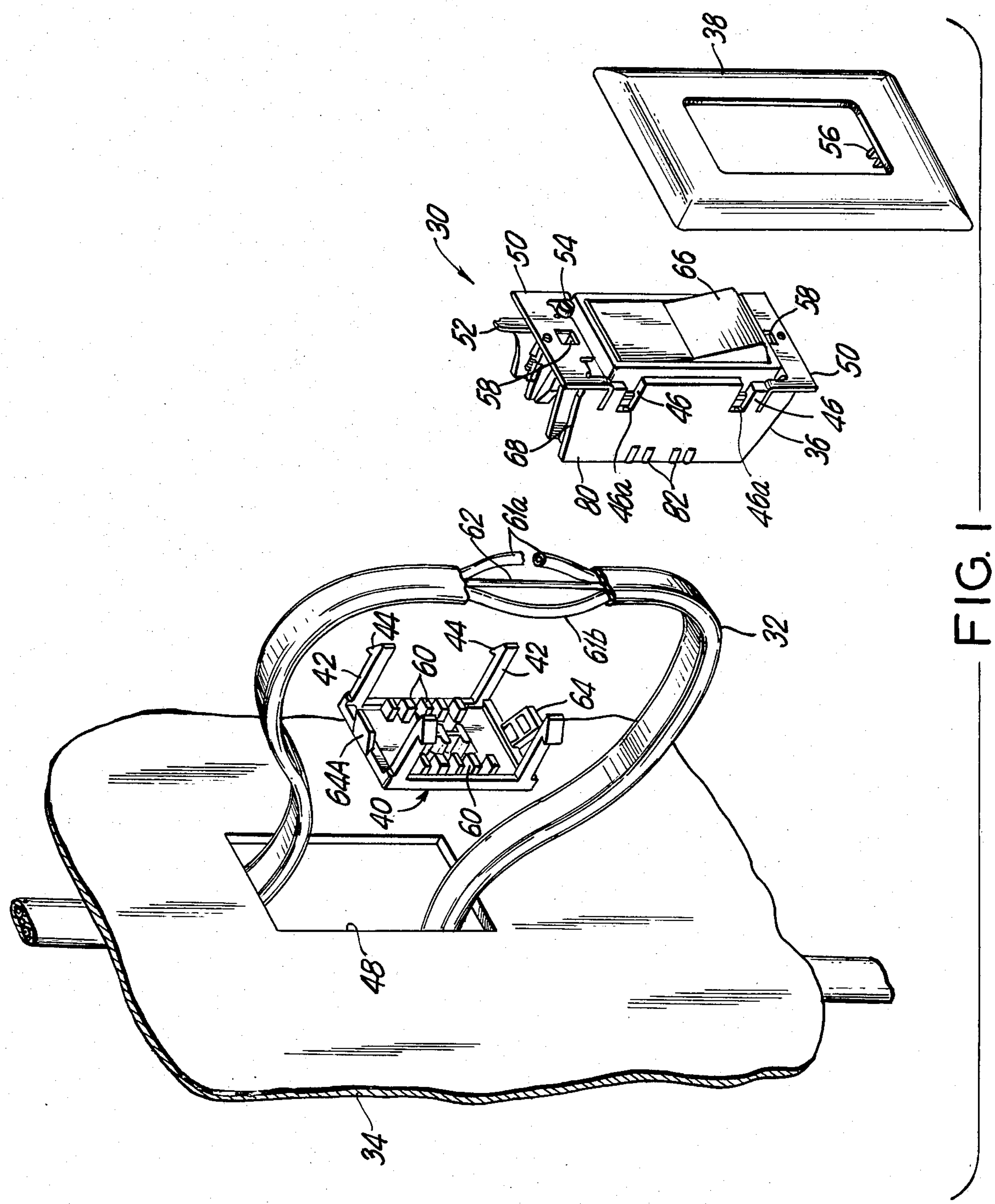
FIG. 1 is an exploded view of a switch having an enclosure and an electrical contact in accordance with the invention.

Referring now to FIG. 1, there is seen an exploded view of a self-contained wiring device of the invention, also known as a boxless device, the wiring device being an exemplary switch 30 which is to be electrically connected to a multiple conductor electric cable 32. The illustration in FIG. 1 of the connection of the switch 30 to the cable 32 applies equally well to other wiring devices constructed in accordance with the invention, such as a receptacle which will be described with reference to FIG. 4. The cable 32 is seen passing behind an exemplary wall 34, such as the wall of a mobile home or a building. The wall 34 serves as a mounting base for supporting the switch 30.

The switch 30 comprises a body 36, a decorative face plate 38, and a back cover 40 which closes an opening in the back of the body 36. The identical face plate 38 and cover 40 maybe utilized, in accordance with a feature of the invention, for other wiring devices such as the receptacle which will be described with reference to FIG. 4. The conductors of the cable 32 are connected to terminals within the body 36 as will be described subsequently. Thereby, the portion of the cable 32 that makes contact with the terminals in enclosed within the switch 30 upon the securing of the cover 40 to the body 36. The cover 40 is provided with four upstanding legs 42 having tabs 44 at the free ends of the respective legs 42. The tabs 44 mate with notches 46 in the sidewalls of the body 36 upon insertion of the cover 40 into the opening at the back of the body 36, and thereby releasably secure the cover 40 to the body 36. That is, each notch 46 forms a lip **46*a* for engaging a corresponding lip 44*a* on each tab 44**.

For convenience in connecting the cable 32 to the switch 30, a portion of the cable 32 is first pulled through an aperture 48 in the wall 34 and sliced, and the cable conductors **61*a*–61*b* are spread apart from ground conductor 62, as described more fully in my co-pending application entitled "WIRE SEPARATION TOOL" (Ser. No. 130,223, filed Mar. 14, 1980), the disclosure of which is incorporated by reference herein. After completion of the wire connections and securing of the cover 40 (as will be described below), the switch 30 is positioned within the aperture 48**.

In order to secure the switch 30 to the wall 34, a flange 50 is formed at each end of the device, and adapted to provide mounting means for securing the device in aperture 48. In one embodiment of mounting means, mounting pawls 52 (FIGS. 12–13) are mounted to and extend behind the flanges 50 (as described more fully below), one such pawl 52 being shown in an extended position in FIG. 1. Upon tightening the pawl 52 in position by a screw 54, the pawl 52 grips the backside of the wall 34 while the flange 50 is pressed against the front side of the wall 34.

Figure 7:
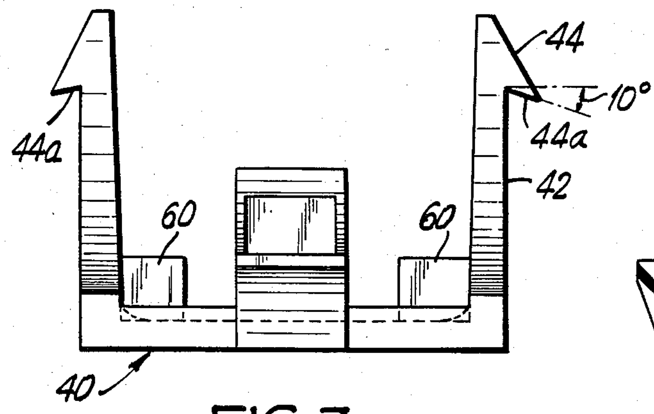
FIG. 7 is an end view of the cover of FIG. 6 showing upstanding legs and tabs thereon.

The tab 44, seen also in FIG. 7, forms a hook at the end of a leg 42 for engaging the edge **46*a* of a notch 46. The hooking edge 44*a* of the tab 44 is undercut at an angle of at least approximately 5°, 10° being preferred, to ensure that the tab 44 remains hooked to the side wall of the body 36. The edge 46*a* of notch 46, which mates with the undercut surface of the tab 44**, is similarly inclined at an angle of approximately 5° to 10°.

The cover 40 may also be readily removed from the body 36 by depressing the two tabs 44 attached to one wall inwardly from the notches 46—i.e., towards the interior of the body. The legs 42 are sufficiently flexible to permit the pressing of the tab 44 without any bowing of the side wall of the body 36. However, the inward depression of the two tabs 44 on one side of the cover induces a bowing of the cover 40 which causes the two tabs 44 attached to the opposite body wall to be withdrawn inwardly from their adjacent notches 46 to permit removal of the cover 40.

Figure 9:
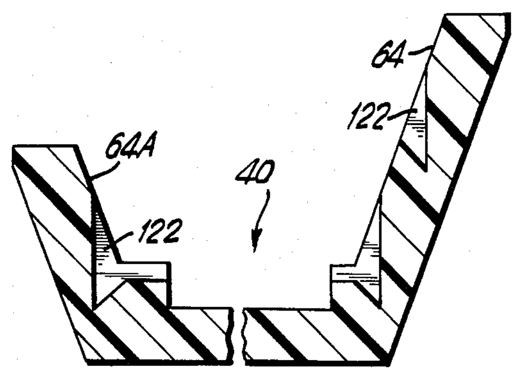
FIG. 9 is a sectional view of the frangible end tabs formed on the cover shown in FIG. 8.

Also seen in FIG. 1 are pairs of tabs 56 on the face plate 38 which engage apertures 58 in the flanges 50, as seen also in FIG. 14, for securing the face plate 38 to the body 36. Tabs 64 formed on each end of the cover 40, seen also in FIG. 9, are molded to facilitate a breaking of the tabs 64 to a prescribed length for providing the desired-site entry at one or both ends of the body 36 for the cable 32 depending on the preference of installation of the cable 32 as will be described more fully below.

An actuator of the switch 30 in the form of a rocker arm, as will be described subsequently, is provided with a decorative panel 66, also seen in FIG. 3 which covers the face of the body 36 and prevents the entry of foreign objects therein while presenting a surface which mates comfortably with the finger of an operator of the switch 30. Body 36, panel 66 and cover 40 may be injection molded from a suitable injection moldable material such as a blend of PPO and ABS sold by General Electric as "NORYL" SE-100, nylon, polycarbonate or polypropylene. Body 36 may be molded from a thermoset such as phenolic or urea formaldehyde; panel 66 is preferably nylon. The flange 50 is made of a suitable metal (such as steel or aluminum) to permit the fabrication of the flange 50 by a stamping and bending procedure.

Figure 2:
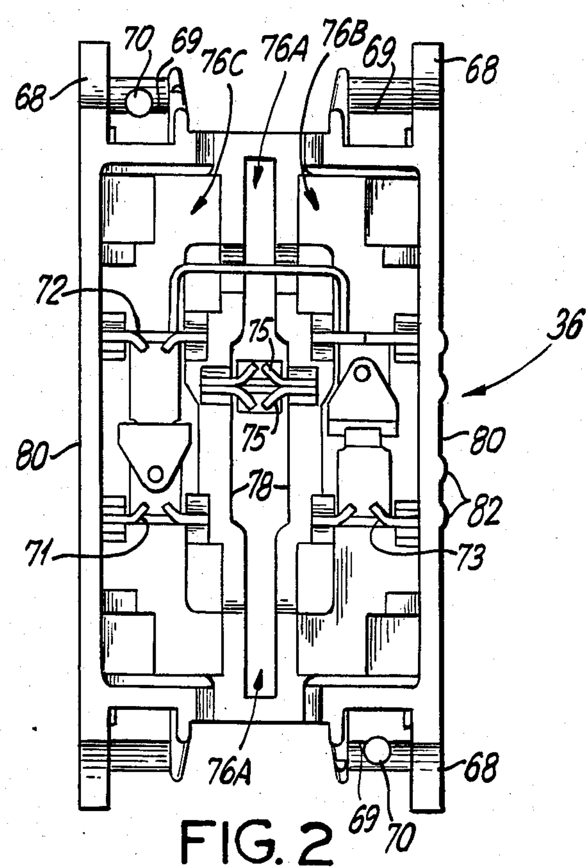
FIG. 2 is a plan view of an interior portion of a three-way switch similar to the switch of FIG. 1 with the back cover removed to show the switch contacts and terminals.

Referring now to FIG. 2, there is seen a view of the interior of the body 36 with the cover 40 removed. The body 36 is provided with projecting wall members 68 at each end, for orienting the pawl 52 of FIG. 1. Also seen are apertures 70 in the front wall portion 69, through which the screws 54 are inserted for engaging the pawls 52. Terminals 71–75 having cutting edges for biting through the insulation on the conductors 62 of FIG. 1 make electrical contact therewith, and the conductors 62 for rigidly securing them within the body 36. It will be apparent that for the switch configurations (e.g., FIG. 1) the outer cable sheathing is stripped prior to wiring the device and one of the live conductors (**61*a***) is severed.

Interior wall members 78 upstand from the front face of the body 36 to support the various terminals 71–75 with the body side walls 80 and divide the housing interior into three insulated sections. Ground terminals 75 are supported between the two walls 78 for receiving central cable conductor 62. Walls 78 likewise form insulated sections 76B and 76C with the interior portion of the sidewalls 80 of the body 36 to support terminals 73–74 and 71–72, respectively, which each receive one of the line conductors (**61*a*, 61*b*) for carrying out the required electrical connections. As a convenience in connecting the line conductors 61*a*–61*b* to the respective terminals of a switch body, one of the sidewalls 80 is shown with raised markings 82 whereby an electrician can identify by touching the side wall of the device which is to be connected to a line conductor (typically, the neutral or "white" wire) of the cable 32**.

Figure 5:
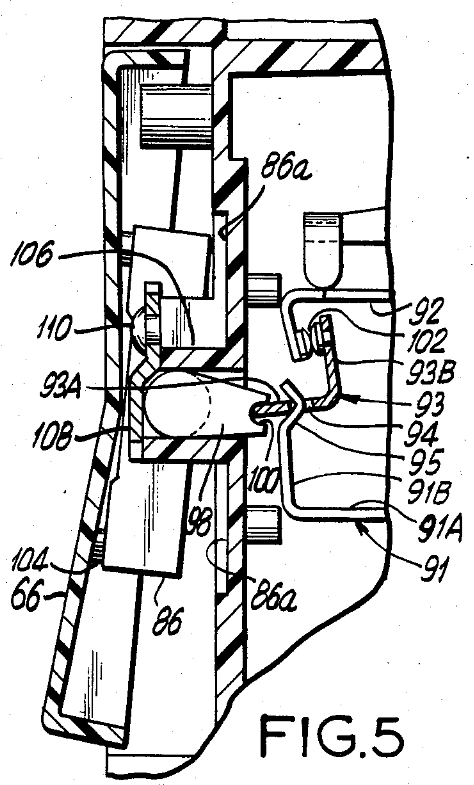
FIG. 5 is a sectional view taken through the front portion of a three-way switch similar to the switch of FIG. 1, showing the actuator and switch contact.
Figure 17:
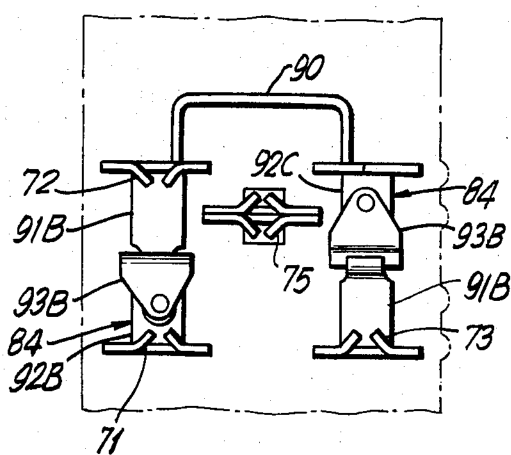
FIGS. 17 and 18 show plan views of alternative configurations of the switch contacts for various switch arrangements.
Figure 18:
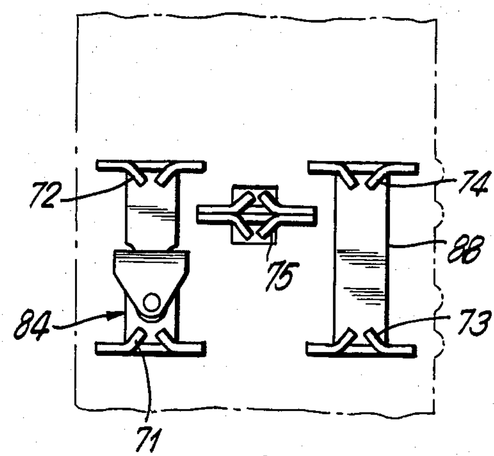

Referring also to FIGS. 5, 17 and 18 along with FIGS. 1 and 2, there are seen two sets of contacts 84 (i.e., a three-way switch) for making and breaking a circuit with each of the line conductors **61*a*–61*b* of the cable shown in FIG. 1. The orientation of one of the contacts 84 is reversed from the orientation of the other of the contacts 84 so that, upon a rocking motion of an actuator 86 which is coupled to the aforementioned panel 66, one of the contacts 84 is open while the second of the contacts 84 is closed. This arrangement of the contacts 84 is exemplary only and, if desired, one of the contacts 84 may be replaced with a shorting bar 88, as seen in FIG. 18, when it is desired to make and break the circuit with only one of the conductors 61 (i.e., a single-pole switch). Alternatively, the contacts 84 may be provided with the same orientation so that both contacts 84 operate simultaneously to either make or break a circuit of the conductors 61. Also, if desired, a conductive strap 90 may be coupled between the arm portion 91B and arm portion 91C which is not associated with a wire-slicing terminal, as shown in FIG. 17** to make a common terminal in a three-way switch.

As seen in the side view of one of the contacts 84 in FIG. 5, the contact 84 is seen to be composed of L-shaped, electrically conducting members 91, 92 annd 93 which are fabricated of a material such as brass to provide a predetermined amount of flexibility to the members 91–93. Bias member 91 is bent at approximately a right angle to form a leg portion 91A and an arm portion 91B. Similarly, the members 92 and 93 are bent to form leg portions 92A and 93A, and arm portions 92B and 93B. A region in the end of the arm 91B is bent in the form of a channel and passed through an aperture 94 in the member 93 to serve as a fulcrum 95 about which the member 93 is pivoted. A wing 98 of the actuator 86 contains a slot 100 for engaging the end of the leg 93A. The portion of the leg 93A located between the fulcrum 95 and the slot 100 is sufficiently small to be readily inserted within the slot 100 during fabrication of the switch 30 of FIG. 1. Contacting surfaces 102 of the members 92 and 93 experience a wiping motion due to flexing of the leg 91A and to the tangential movement of the arm 93B under the pivoting of the leg 93A. A resilient bending of the arm 91B provides a snap action to the wing 98 and the actuator 86. For single-pole (FIG. 18) and three-way (FIG. 17) switch contacts 84, the member 92 is formed integrally with the terminal 71, and the member 91 is formed integrally with the terminal 72. In the three-way switch, the member 91 is formed integrally with the terminal 73, but the member 92 is not formed integrally with any wire-slicing terminal.

Figure 3:
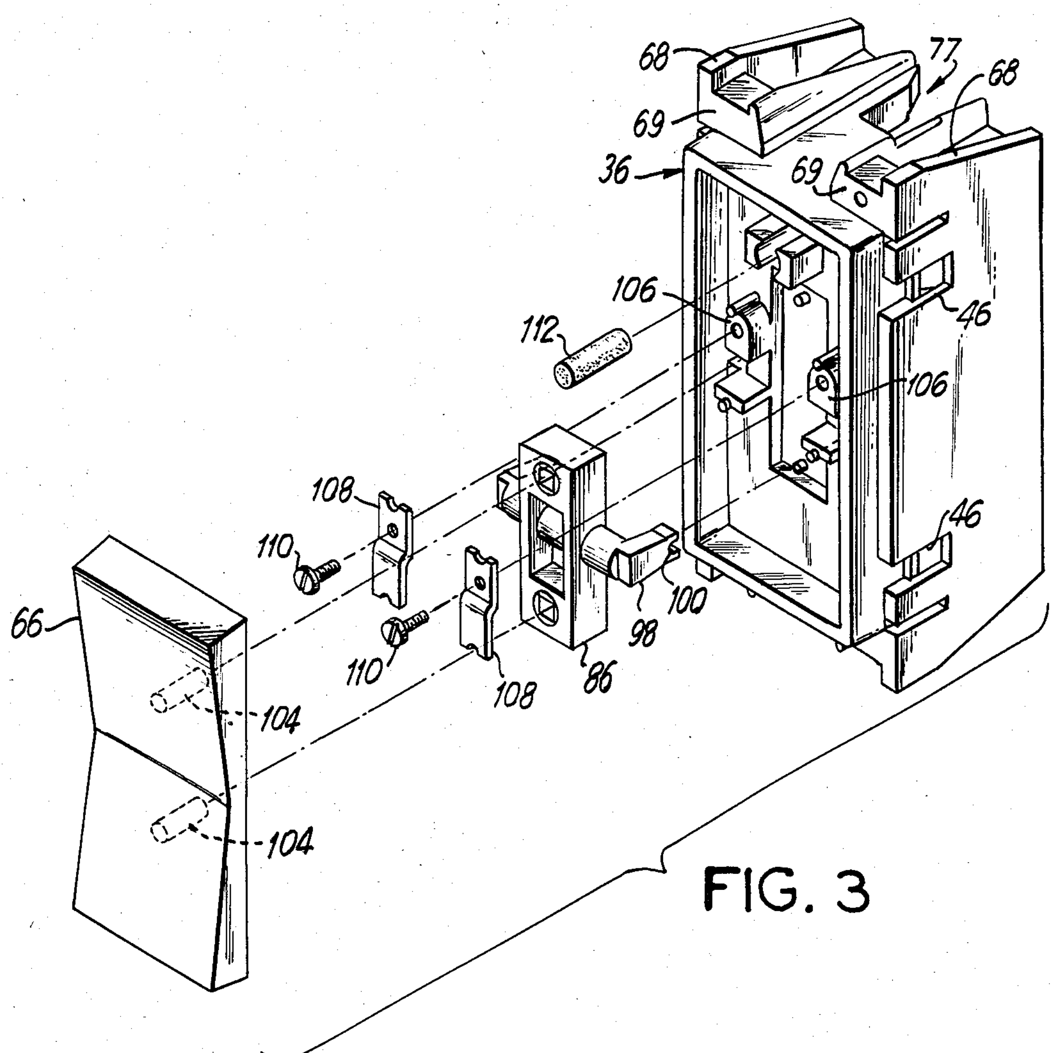
FIG. 3 is an exploded view of a rocker-arm actuator portion of the switch of FIG. 1.

Referring also to FIGS. 3 and 5, further details of the switch 30 are more readily seen. The panel 66 is secured by pegs 104 to the actuator 86. The wings 98 of the actuator 86 are secured to pedestals 106 by tabs 108 which are fabricated of a resilient material such as brass and are anchored by screws 110 into the pedestals 106. A bumper 112 conveniently fabricated of a soft material such as rubber, is positioned between the panel 66 and the face of the body 36 to soften a snaping sound of the panel 66 and the actuator 86 resulting from the spring action of the member 91 in pushing the leg 93A against the actuator 86.

Figure 4:
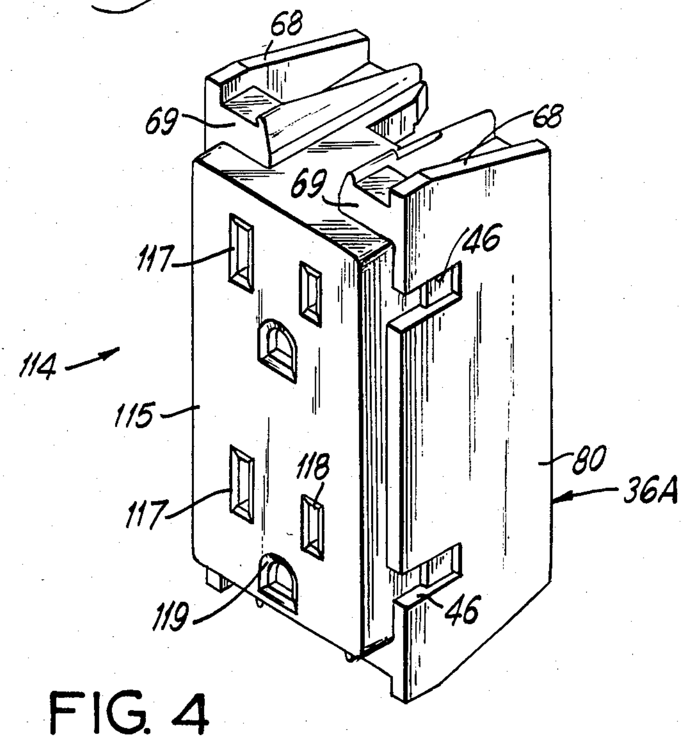
FIG. 4 shows an isometric view of an enclosure for a receptacle, the enclosure having a form similar to that of the enclosure of FIG. 1.

Referring now to FIG. 4, the similarity in structure between the foregoing switch and a receptacle 114, constructed in accordance with the invention, may be seen. The receptacle 114 has a body 36A which is substantially the same as the body 36 of the switch 30 of FIG. 1, the body 36A differing in that a face member 115 is provided with apertures 117–119 for receiving the prongs of a plug (not shown) on an electrical cable. As seen in FIG. 4, the body 36A includes the side walls 80, the notches 46 and the guide channels 68 which have been previously seen in FIG. 3. Back cover 40 of FIG. 1, not seen in FIG. 4, is utilized for closing off the back of the body 36A as was taught previously with reference to the body 36 of FIG. 1.

Figure 6:
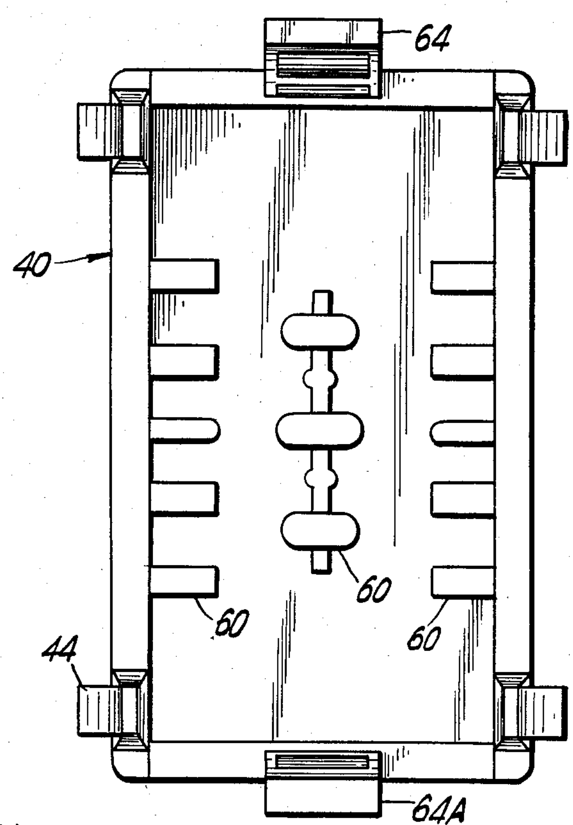
FIG. 6 is a plan view of the back cover for closing the back opening of the switch body of FIG. 1 or the receptacle of FIG. 4.
Figure 8:
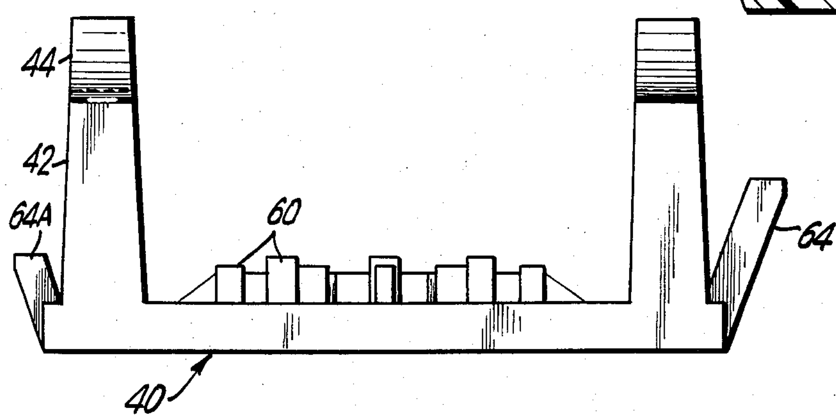
FIG. 8 is a side view of the cover of FIG. 6.

Referring now to FIGS. 6, 7, 8 and 9, there are seen detailed drawings of the cover 40 which was previously described with reference to FIG. 1. The legs 42 are seen to be positioned at the corner of the cover 40 with the tabs 44 being located on the ends of the respective legs 42. The undercut angle at the tab 44 of 5° to 10°, referred to previously, is clearly seen in FIG. 7. Also, the arrangement of the posts 60 and of the tabs 64 are seen in FIGS. 6 and 8. In the sectional view of the tabs 64 in FIG. 9, voids 122 have been provided for weakening the tabs 64 to permit a ready breaking off of a portion of a tab 64 at a predesignated location, the location being designated by the position of a void 122.

A convenience feature provided by the back cover 40 is seen in FIGS. 8 and 9 wherein the tabs are of unequal length, the longer tab 64 being at one end while a shorter tab 64A is located at the opposite end of the cover 40. In the event that only one electrical cable is to be attached at only one end of the switch 30 of FIG. 1 or at only one end of the receptacle 114 of FIG. 4, the cover 40 is fitted into the body 36, or the body 36A, with the shorter tab 64A being placed over the electrical cable. The length of the longer tab 64 is sufficient to permit the end of that tab 64 to close one of the openings 77 formed in each endwall of the body 36 or 36A for complete closure of the body, the shorter tab 64 abutting the cable to close the other end. Thus, no adjustment of the lengths of the tabs 64 and 64A is required for attachment of a single electrical cable at one end of the switch 30 or at one end of the receptable 114.

In the event that a cable such as the cable 32 of FIG. 1 is to pass through the switch 30 or the receptable 114, then the longer tab 64 is to be shortened by breaking at the first void 122 whereupon both of the tabs have approximately the same length for clearing the cable 32 and both tabs will abut the cable in each opening 77. Should it be desired to connect two such cables at one end of the switch 30 or at one end of the receptacle 114, then either tab 64 or 64A may be broken off at its bottom, via a void 122, to permit the passage of two cables through the cover 40.

As seen in FIGS. 6 and 8, the posts 60 are arranged in three rows corresponding to the three rows (71–72, 73–74 and 75) of contacts in the housing. Thus, the center row of posts 60 is utilized in pressing the center (or ground) conductor 62 into terminal 75. Similarly, the two side rows of the posts 60 are utilized to force the outer (or line) conductors **61*a*–61*b* into terminals 71–72 and 73–74**. Closure of the device may be carried out by using the tool described in the above-mentioned copending application Ser. No. 130,223, filed Mar. 14, 1980.

Posts 60 are preferably positioned symmetrically about the center of the cover 40 enabling the cover 40 to be inserted in the body 36 or 36A such that either end of the cover 40 may be located at any one end of the body 36 or 36A. By providing the center row of posts 60 with a greater height than the other two rows of posts 60, the ground conductor 62 can be made to seat within its terminal 75 before the seating of the line conductors **61*a*–61*b* of the cable 32 in their respective terminals. Thereby, in the event that electrical connection is attempted while the line conductors are energized or "hot", the ground wire makes contact first to help avoid a short circuit. In addition, since the ground wire usually has no insulation, the additional height of the center line of posts insures that the ground conductor is pressed into terminals 75**.

After the cover 40 has been inserted into the back opening of the body 36 or 36A a sufficient distance to insure contact between the terminals and the conductors, the tabs 44 on the legs 42 latch into the notches 46 of the side walls 80, as was described previously. The undercut angle in the mating surfaces **44*a* and 46*a* between tabs 44 and a notch 46 insures retention of the cover 40 even in the presence of a force which could tend to unseat cover 40**.

Figure 12:
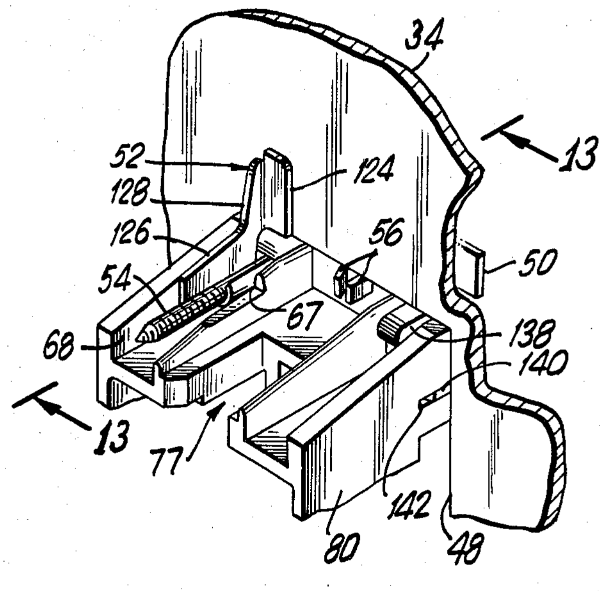
FIG. 12 is an isometric view similar to that of FIG. 11, showing an alternate embodiment of mounting means.
Figure 13:
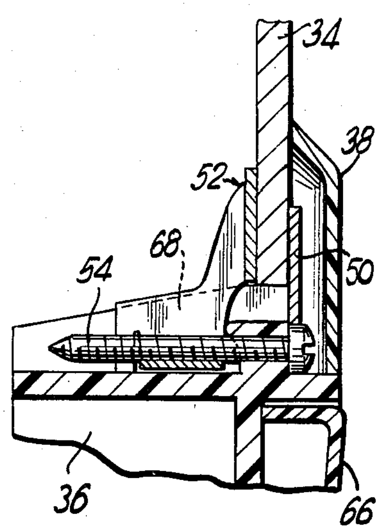
FIG. 13 is a sectional view taken along lines 13—13 of FIG. 12.

Referring now to FIGS. 12-13, there is seen a more detailed illustration of the pawl 52 and the wall portion 68 which were previously described with reference to FIGS. 1 and 2. In FIG. 12, there is seen a pawl 52 anchored against the rear surface of the wall 34 while in FIG. 13, the flange 50 is seen abutting the front surface of the wall 34 while the pawl 52 presses against the back surface of wall 34 to hold the body 36 within the aperture 48 in the wall. As shown in FIG. 12, the pawl 52 comprises a foot 124 and a receptor 126 for the screw 54, the foot 124 being joined to the receptor 126 by a gusset 128. When the pawl 52 is at distance from the wall 34, it is free to rotate about the screw 54 between a position generally flat against the body end wall and a position against wall 68, the angle of rotation being approximately 90°. The receptor 126 is formed of a U-shaped channel having a radius of curvature equal to the threads of the screw 54 so that the receptor 126 is threadably engaged with the screw 54.

Figure 10:
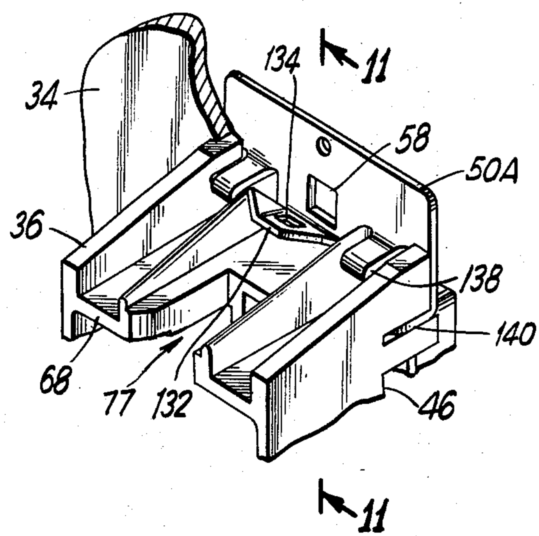
FIG. 10 is an isometric view of one end of a switch or receptacle according to the invention, showing one embodiment of mounting means.
Figure 11:
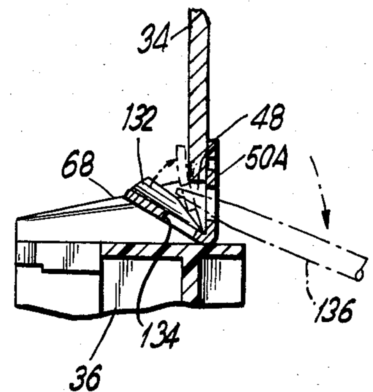
FIG. 11 is a sectional view taken along lines 11—11 of FIG. 10.

Turning now to the alternate mounting means shown in FIGS. 10-11, the flange 50A is similar in construction to flange 50 of FIGS. 12-13. Both the flanges 50 and 50A, as well as the pawl 52 and screw 54, are constructed of the same material, for example, a metal such as steel or aluminum. Flange 50A, however, is formed with a tongue 132, integrally therewith, and has an aperture 134 through which a tool such as a screwdriver 36 can be momentarily inserted (after insertion through aperture 58) for bending the tongue 132 towards the wall 34 at the edge of the aperture 48. The mounting means of FIGS. 10-11 is best used for wall (34) thickness of between about 5/32" and about ¼"; pawl mounting 52 can be used for any thickness down to about 5/32".

The flanges 50 and 50A both include at least one tab 138 which is bent about a lip formed on wall portion 69, and a tab 140 (preferably formed with a hook-like structure on its end) which is bent about a side wall 80 and into a groove 142 of the side wall 80 for securing the flanges, 50 or 50A, to the body 36 or 36A. A second tab 140 of the flanges 50 and 50A not seen in the FIGURES, is located on the opposite side of the body 36 or 36A and similarly secured thereto. Thus, it is seen that the tabs 138 and 140 provide, as a feature of the invention, a hooking of the flange 50 or 50A in orthogonal directions about a corner of the body 36 or 36A to firmly secure the flange 50 or 50A without screws or rivets and avoids the need for a continuous strap around the body, thereby conserving material.

Referring now to FIGS. 14 and 15, there is seen a more detailed view of the face plate 38 with its tab 56 for connecting with the aperture 58 in the flange 50 whereby the face plate 38 is supported in position around the panel 66 of the switch 30 as was previously described with reference to FIG. 1. The tabs 56 on plate 38 may be formed by using a simple two-part injection molding apparatus for fabricating plate 38. Because of the resilience of the plastic materials usable for making plate 38 (e.g., a PVC or a blend of PPO and ABS sold under the trademark "NORYL" SE-100 sold by General Electric Co.), the tabs 56 of each pair can bend towards each other as the mold parts are separated, without damaging the tabs. Likewise, the plate 38 can be repeatedly attached to and removed from flange 50 generally without damaging tabs 56. Also, removal of the face plate 38 permits access to the screws 54 of FIGS. 12-13 for releasing or tightening of the pawls 52.

Thereby, it is seen that the switch 30 may be readily attached and detached from the wall 34.

Referring now to FIG. 16, there is seen a view of the interior of the receptacle 114 of FIG. 4, the view of FIG. 16 looking into the back opening opposite the face member 115 to show an arrangment of terminals analogous to that of the switch 30 portrayed in FIG. 2. Thus, the terminals 71-75 appear in both FIGS. 2 and 16. The apertures 117-119 of FIG. 4 are also seen in FIG. 16. The arrangement of the side walls 80 and the wall members 68 of FIG. 16 is the same as that previously disclosed with reference to FIG. 2. And as noted hereinabove with reference to FIG. 4, the cover 40 of FIG. 1 is utilized for both the bodies 36A and 36.

Referring also to FIG. 16A, there is seen a side elevation view of the terminals 73, 74 and 75 with the supporting portions and the side walls of the body 36A being deleted to better show the configurations of the terminals and the conducting members which connect the terminals to the apertures 117 and 119 of the face member 115 of FIGS. 4 and 16. The terminals 73 and 74 are integrally formed with a member 144 and tabs 147, 148, 149 and 150 which are located at the ends of the member 144 (blade-receiving tabs 147-150 may be essentially identical to those sold by Slater Electric Inc., Glen Cove, N.Y. under Catalog No. 3030). Located behind the member 144 is a member 152 which is electrically coupled to the terminals 75 by simple force-fit contact therebetween, the member 152 being integrally formed with tabs 155-156 at the ends thereof.

The tabs 147-148 grasp the prong (not shown) of an electrical plug (not shown) connected to the receptacle 114 via one of the apertures 117. Similarly, the tabs 149-150 grasp a prong in the other aperture 117. The tabs 155-156 grasp prongs in the two apertures 119. A third member 144A (not seen in FIG. 16A) has a shape which is the mirror image of member 144, and grasps prongs in the apertures 118 for coupling electric current to the terminals 71-72. The configuration of the members 144 and 152 permits a facile fabrication of the members and insertion of the members into the body 36A.

Figure 19:
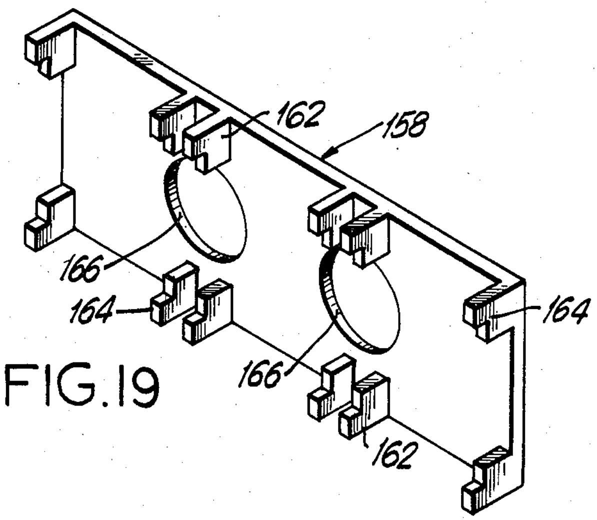
FIG. 19 shows a tool useful in positioning a plurality of wiring devices of the invention within an enlarged aperture of a wall.
Figure 20:
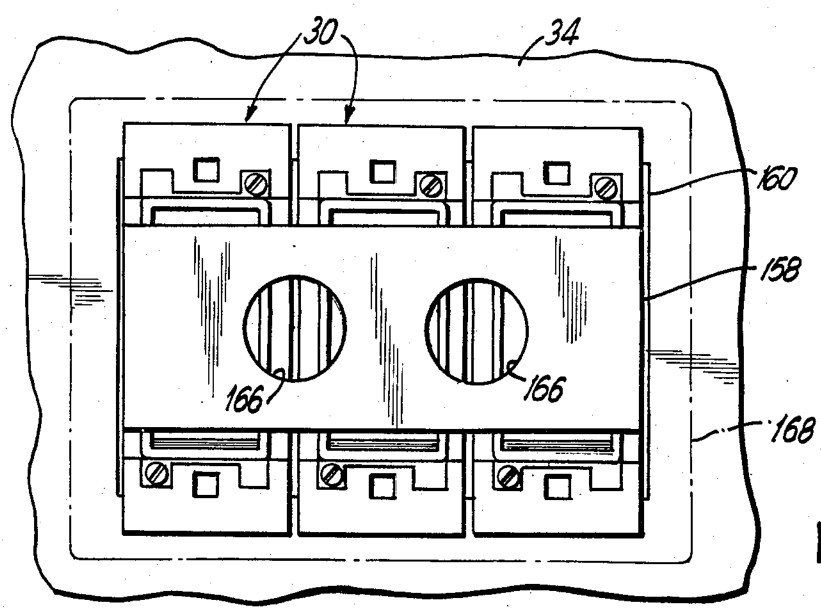
FIG. 20 shows the tool of FIG. 19 in use for positioning several of the electrical components.

Referring now to FIGS. 19 and 20, a tool 158 is shown for positioning a set of switches 30 or receptacles 114 within an enlarged common aperture 160 of the wall 34, the aperture being larger than the aperture 48 of FIG. 1 as is used for a single switch 30. The pawl 52 of FIGS. 12 and 13, through its rotation of 90°, is able to contact the upper or lower horizontal edge of the common aperture 160. The restriction on the rotation of the pawl 52 to the aforementioned 90° permits the pawl 52 to be tightened into position alongside a stud which may be positioned at the vertical edge of the aperture 160. The tool 158 is provided with guide pins 162 which engage the notches 46 alongside the recessed edges of the face of the switch 30, as seen in FIG. 1, a similar arrangement of the notches 46 alongside the recessed edges of the face member 115 of the receptacle 114 being seen in FIG. 4. The inward displacement of the edges of the face member 115 clear a direct passage to the notches 46 for the pins 162. Thereby, the tool 158 may be placed over the faces of the switches 30 or the receptacle 114 to urge them into alignment with each other for a uniform positioning of the electrical components within the aperture 160 as is seen in FIG. 20. To facilitate use of the tool 158, the guide pins 162 are provided with shoulders 164 which engage the front face of the switch 30 or receptacle 114 upon insertion of the pins 162 into the notches 46. Also, finger holes 166 are located within the tool 158 to facilitate handling and removal of the tool by a person performing the installation. After tightening the screws 54, the tool 158 is removed and a common faceplate 168, indicated in phantom, may then be installed.

Figure 21:
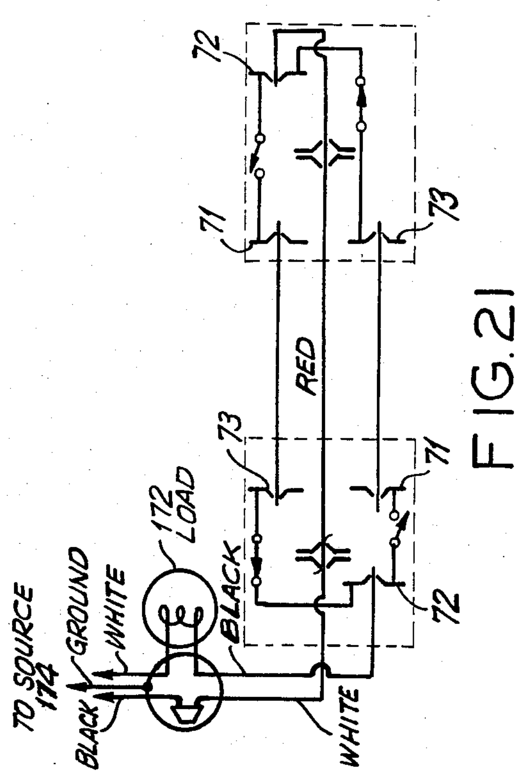
FIG. 21 is a schematic diagram of an exemplary three-way lamp circuit utilizing a pair of switches constructed in accordance with FIG. 17.

Referring now to FIG. 21, there is seen a schematic diagram of an exemplary lamp circuit 170 incorporating a pair of the switches 30 of FIG. 1 which are fabricated with the contacts 84 in opposed order as shown in FIG. 17, and including the conducting strap 90 of FIG. 17. The circuit 170 may be referred to as "three way" circuit and provides for independently controlling the energization of a lamp 172 with electric current from a source 174 by either of the two switches 30. Within the diagrammatic representation of each of the switches 30, portions of the lines have been made heavy to symbolize the corresponding terminals coupled to the contacts 84 in a switch 30 according to the arrangement of FIG. 17. Thereby, it is seen how the reverse order of emplacement of a pair of the contacts 84 to be operated by a single actuator 86, in conjunction with the coupling of the members 91B and 92C with the strap 90, permit the use of the switch 30 in a three-way circuit.

Figure 22:
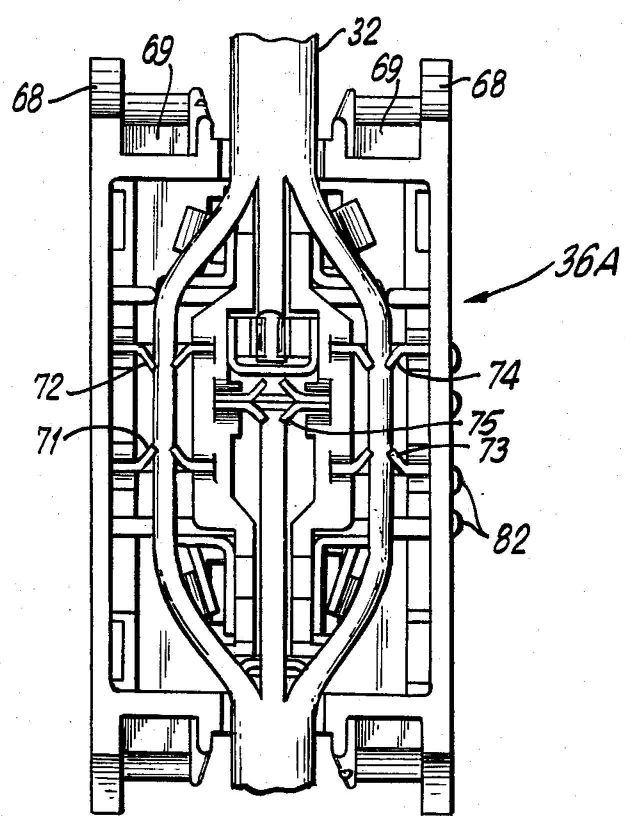
FIG. 22 is a view similar to that of FIG. 16, with a cable shown coupled to the receptacle terminals.

Referring now to FIG. 22, the receptacle body 36A of FIG. 16 is repeated, FIG. 22 further showing the conductors 62 of the cable 32 in position and clasped by the terminals 71–75. FIG. 22 is shown on the same sheet as FIG. 2 since the placement of the conductors 62 would be the same for the switch body 36 of FIG. 2. However, when wiring the cable 32 to a single-pole switch 30, the line conductor **61*a* is severed (FIG. 1). One of the severed portions is attached to terminal 72 and the other to terminal 71. Conductor 61*b* is attached to terminals 73–74 (see FIG. 18). Wiring of a three-way switch will be apparent from FIG. 21**, but it will be understood that, in the switch closest to the load, what would normally be the ground terminal is used to join the "red" wire from the three-wire cable to the "white" wire of the two-wire cable.

Figure 23:
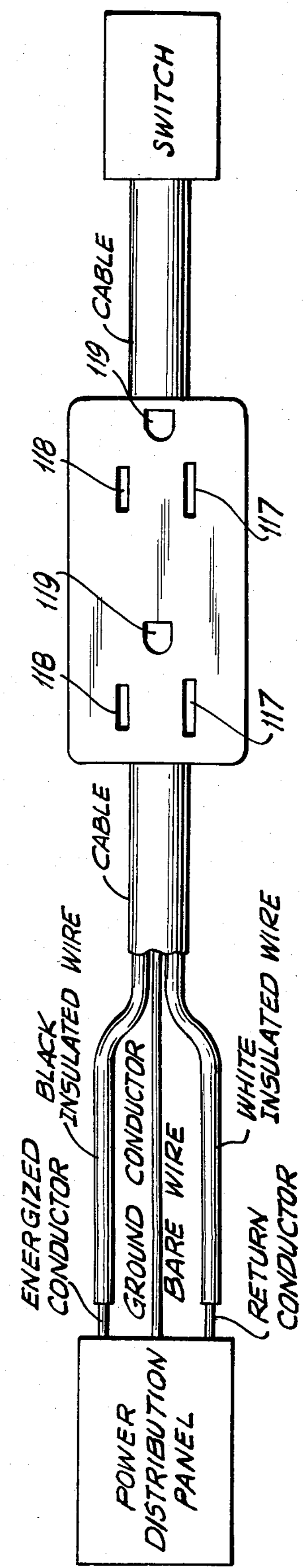
FIG. 23 is a stylized representation of an end-of-line switch/receptacle configuration compatible with the wiring devices of the invention.

Referring now to FIG. 23, there is seen a stylized view of the receptacle coupled to a switch which selectively energizes or deenergizes a desired receptacle outlet. The left set of terminals of FIG. 23 remains continuously connected to the input power cable, and is therefore continuously energized independently of the switch. The arrangement of FIG. 23 is conveniently installed in a home by connecting the input cable to a power distribution panel, while the output cable passes through the wall of a house to permit emplacement of the switch at a convenient location, such as adjacent the door of a room. The receptacle may be placed in the wall adjacent an article of furniture, such as a table containing a clock and a lamp. The clock would then be plugged into the left set of terminals which is continuously energized, and the lamp would be plugged into the right set of terminals to be operated by the switch.

Figure 24:
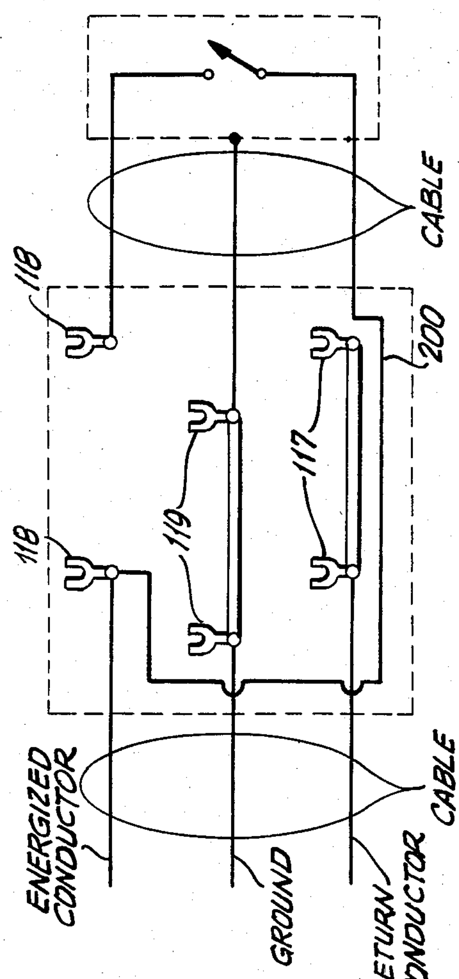
FIG. 24 is a schematic diagram of a wiring configuration for the switch and receptacle shown in FIG. 23.

Referring also to FIG. 24, there is seen a stylized view of the connection of the terminals within the receptacle to each other and to the input and the output cables. The plastic body which houses the terminals in FIG. 23 has been deleted in FIG. 24 to show the arrangement of the terminals and the interconnecting metallic conducting members. The terminal 118 of the left set is connected to the energized, or "hot" wire having the black insulation, while the terminal 117 of the left set is connected to the return wire having the white insulation. Also, the terminal 117 of the right set is connected via the electrically conducting member to the terminal 117 of the left set. The remaining terminal, namely, the terminal 118 of the right set, is coupled via the switch to the terminal 118 of the left set.

Figure 25:
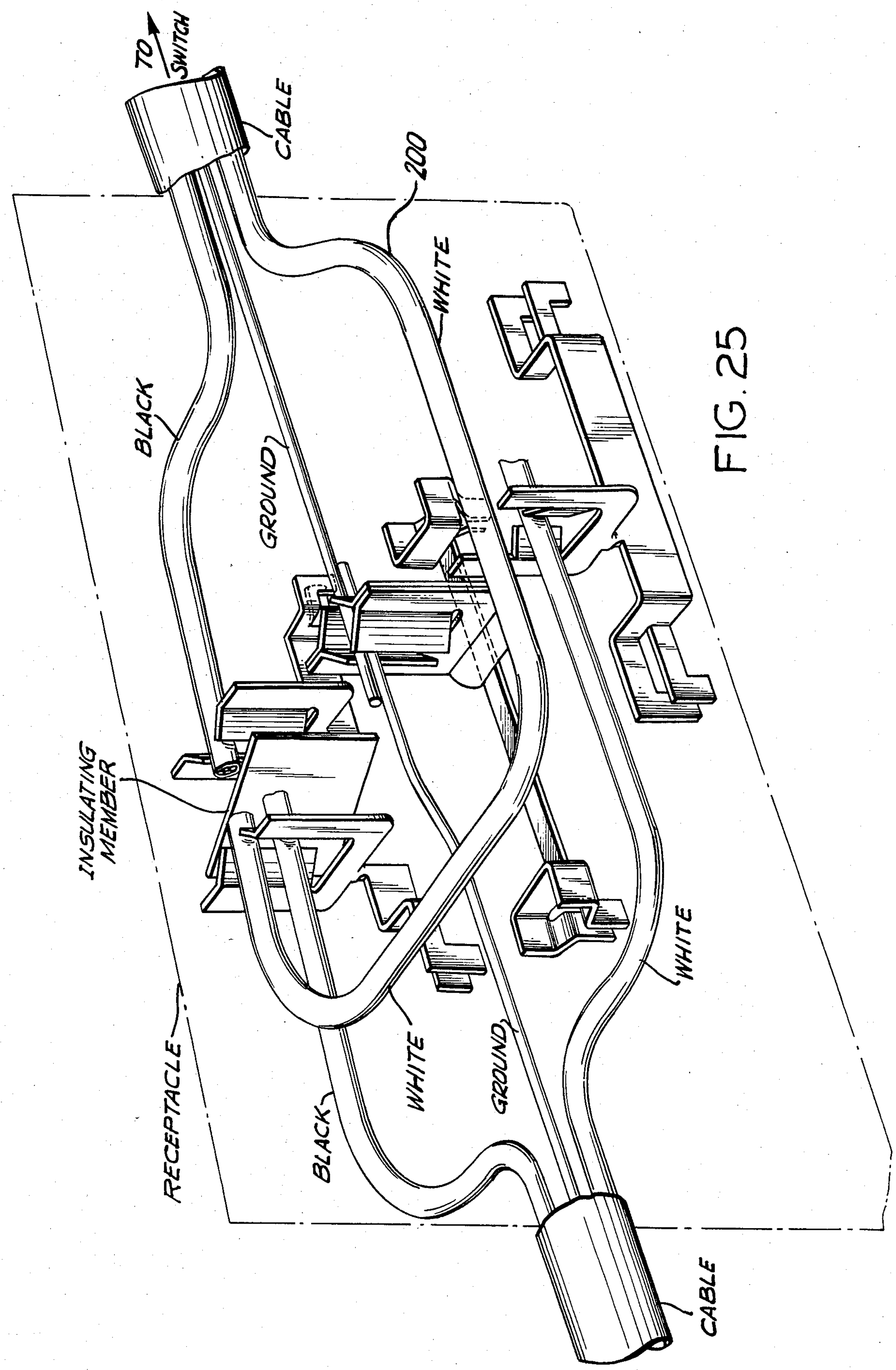
FIG. 25 is a stylized view of the wiring configuration of FIG. 24.

In accordance with a feature of the invention, the foregoing coupling of the two terminals 118 via the switch is accomplished by a wiring arrangement as portrayed in the stylized pictorial view, in FIG. 25, of the back side of the receptacle with the cover removed. As in FIG. 24, the plastic body has also been removed to facilitate a viewing of the locations of the wires and the terminals interconnected by the wires. The coupling of the switch to the right terminal 118 is accomplished by a black wire of the output cable, and the coupling of the switch to the left terminal 118 is accomplished by a white wire 200 of the output cable.

In order to provide a passageway for the white wire 200, the left terminal 117 is joined to an apodized wire clasping wing 202 of reduced height which pierces the insulation of only the white wire of the input cable. The reduced height permits the white wire 200 to loop from the left terminal 118 and pass over the wing 202 to join the output cable. By use of the apodized wire clasping wing 202 in the left terminal 117, a passagway of the receptacle may be occupied by two wires while, in accordance with the invention, only one of the wires has its insulation pierced by a wire clasping wing of a terminal. Thereby, it is possible to couple the receptacle to the switch without having to enlarge the receptacle to provide space for the interconnecting wiring.

It is to be understood that the above-described embodiments of the invention are illustrative only and that modifications thereof may occur to those skilled in the art. For example, bumper 112 in FIG. 3 is preferably only used in a one-way switch to help silence the switch when it is opened. In a three-way switch, the contacts determine the stop points of the rocker motion and the bumpers are unnecessary.

It will also be appreciated that a recess (**86*a* in FIG. 5) may be formed in the front wall surface of the body member to provide ample room for actuator 86 and ensure that any part of the actuator does not engage such front wall when moved between its operative end points. Thus, if the mating portions 102** of the contacts wear down with use, the actuator will not touch the wall surface to prevent mating between such reduced-height portions.

In addition, it will be appreciated that back cover 40 can easily be molded in a two-part injection mold to form all the structures described above, including frangible tab members 64. Furthermore, the tapered end edges of wall portions 68 serve to facilitate installation of the devices in the wall opening by "funneling" the devices thereinto.

When the pawl mounting means are used, the interior reinforcing rib **68*a* can be eliminated or formed with a clearance cut 67 (FIG. 12) to permit free rotation of pawl 52. Thus, regardless of the location of pawl 52 along screw 54, the pawl can always lay against the body endwall so that it does not interfere with insertion into the wall opening. In addition, it will be understood that receptor 126 tightly engages the threads on screw 54 to ensure that pawl 52 rotates into wall 68** when the screw is turned.

Because of the switch contact structures shown in detail in FIG. 5, the spring biasing arm 91B only moves through about 0.0035" during actuation. This results in virtually no metal fatigue for long term reliability of the switch. Also, there is virtually no access from the front of the body to the contact members, which renders the switch extremely safe when installed.

Accordingly, it is desired that this invention is not to be limited to the embodiment disclosed herein.

What is claimed is:

1. An electrical component for coupling to an electrical cable and adapted to be mounted through an opening in a supporting base, said component comprising:

an enclosure having a front face and side walls projecting rearwardly therefrom to form an opening along their rear edges opposite said front face, said side walls including apertures therein generally adjacent said front face;

a cover adapted to be secured to said enclosure generally adjacent said rear edges so as to be spaced apart from said front face by said side walls, said cover having a set of flexible legs extending from edges thereof and terminating in tabs adapted to be received in said apertures for securing said cover directly to said enclosure yet permit removal of the cover when desired by removing said tabs from said apertures, such that said cover closes the rear edges of said side walls by locking engagement between said tabs and said apertures generally adjacent said front face.

2. A component according to claim 1, wherein an edge of each said tab engages a lip formed by its corresponding aperture, each said edge and lip forming inclined mating surfaces relative to said side walls and said legs for ensuring secure attachment of said legs to said side walls.

3. A component according to claim 2, wherein said legs are sufficiently flexible to permit removal of said tabs from said apertures in said sidewalls without a bowing of said side walls.

4. A component according to claim 2, wherein said edge of said tab is oriented at from about 95° to about 100° with respect to its leg.

5. An electrical wiring device adapted to be mounted through an opening in a supporting base, said wiring device comprising:

a body portion having a front face and a wall assembly extending rearwardly therefrom, said wall assembly including at least a pair of oppositely disposed side wall members providing an opening along their rear edges, said side wall members including apertures therein generally near said front face;

a cover adapted to be secured to said body portion generally adjacent said rear edges of said side wall members, said cover having a set of flexible legs extending therefrom, said flexible legs terminating in tabs which are adapted to be received in said apertures for securing said cover directly to said body yet permitting removal when desired by causing said tabs to be withdrawn from said apertures;

a flange on said body for abutting the supporting base when said body is inserted through the opening therein;

a mounting pawl having a screw receptor disposed along an axis of said pawl, said receptor being generally U-shaped;

a screw passing through the flange on said body to mate with and be threadably received within the U-shaped portion of said receptor;

a foot on said pawl disposed normally to said pawl axis for engaging the supporting base, said foot being joined to said receptor by a gusset; and a wall member on said body to limit rotation of said gusset, said gusset being rotatable about said screw through an angle of only approximately 90°, from a position generally adjacent and parallel to a portion of said body to a position generally perpendicular thereto, such that the wiring device can be mounted closely adjacent a support stud with the supporting base sandwiched between the flange and said mounting pawl.

6. A self contained wiring device comprising;

an enclosure having a face, side walls attached to said face, and a cover adapted to be positioned along an edge of said side walls opposite said face, the edges of said face being displaced inwardly from the edges of said side walls, said side walls having notches adjacent the recessed edges of said face, said cover having legs with tabs thereon for engaging said notches; and flanges secured at opposite ends of said enclosure, said enclosure being provided with guide channels and grooves for receiving tabs of said flanges, said tabs being secured within said channels and said grooves in orthogonal directions for attaching said flanges to said enclosure, each of said flanges including a flexible tongue which may be bent for securing said wiring device to a mounting base, which is grasped between said flanges and said tongues bent towards said flanges.

7. A device according to claim 6 for wherein said tongue is apertured to receive a tool for bending said tongue.

8. A self-contained electrical wiring device for electrical termination to an insulated electrical power cable to provide an electrical switching or receptacle function, comprising:

a housing member having a front portion and a wall structure projecting rearwardly therefrom, which includes a pair of oppositely disposed sidewalls joined between a pair of oppositely disposed endwalls, and said housing having a generally open back;

electrical terminal means supported within said housing by portions of said wall structure and portions of wall members upstanding from said front portion on its interior surface;

electrical operation means electrically coupled to said electrical terminal means and accessible at said front portion from its exterior surface for providing an electrical function of said device; and a back cover adapted to releasably lockably engage said housing to close the back of the wiring device, said wiring device being adaptable to provide a desired electrical function by forming said front portion and said electrical operation means to carry out the desired electrical function, said wall structure, said electrical terminal means and said back cover being essentially the same for receptable devices and switch devices and said housing and back cover interlocking with each other to fully enclose said electrical terminal means and provide said electrical operation means in a two-piece enclosure.

9. A wiring device according to claim 8, wherein said front portion includes a projection which has a perimeter recessed relative to said endwalls and sidewalls and provides access to the desired electrical function, and which further includes a frame-like face plate adapted to be releasably secured to said front portion so as to expose said projecting portion, said faceplate being essentially identical for receptacle devices and for switch devices, such that said faceplate provides a decorative surface over mounting and other structures which are needed for installation of the wiring device but are not aesthetically appealing.

10. A wiring device according to claim 9, wherein said faceplate is made from an injection moldable material and include two pairs of cantilever-like tab members projecting from its back surface, said tabs in each said pair diverging slightly from each other for essentially equal lengths but having end portions which converge towards each other to form a pair of oppositely facing peaks, such that each said pair of tab members deflect towards each other when initially inserted in an aperture formed in said wiring device and resiliently deflect away from each other after the peaks of said tab members have been inserted past the aperture.

11. A wiring device according to claim 9 wherein said wiring device is formed with at least one aperture, and wherein said faceplate is made from an injection moldable material and includes at least one pair of cantilever-like tab members projecting from its back surface to engage a said aperture in the device, said tabs in said pair diverging slightly from each other for essentially equal lengths but having end portions which converge towards each other to form a pair of oppositely facing peaks, such that said pair of tab members deflects towards each other when initially inserted in the aperture formed in the wiring device and resiliently deflect away from each other after the peaks of said tab members have been inserted past the aperture.

12. A wiring device according to claim 11 which includes two of said pairs of tabs to engage two apertures in the wiring device, said faceplate having a frame-like shape adapted to reside within a outer recessed portion of the device along its front face.

13. An electrical wiring device adapted to be mounted through an opening in a wall, said wiring device comprising:

a body portion having a front face and a wall assembly extending rearwardly therefrom, said wall assembly including oppositely disposed endwall portions and a pair of oppositely disposed side wall members providing an opening along their rear edges, said side wall members including apertures therein generally near said front face;

a cover adapted to be secured to said body portion generally adjacent said rear edges of said side wall members, said cover having a set of flexible legs extending therefrom, said flexible legs terminating in tabs which are adapted to be received in said apertures for securing said cover directly to said body yet permitting removal when desired by causing said tabs to be withdrawn from said apertures;

a flange on said body at each endwall portion for abutting the supporting base when said body is inserted through the opening therein;

a relatively elongate screw received in a screw-receiving aperture formed at each flange, said screw having a head portion proportioned to abut the front of its corresponding flange when said screw is received in said aperture;

a pawl member threadably engaging each said screw, said pawl member including a foot portion adapted to abut the back of the wall when said pawl is positioned in mounting configuration and a generally U-shaped receptor portion coupled to said foot portion to threadably engage said screw; and a wall portion formed on the wiring device generally adjacent each screw, said wall portion being generally co-extensive with a sidewall member of the wiring device body and projecting beyond the endwall portion of the device, such that prior to mounting the device, said pawl member lies generally against its corresponding endwall portion so as not to interfere with insertion of the device into an opening in the wall, and, after the device is positioned within the wall opening said screw is turned to draw said pawl member towards said flange and said pawl member is also rotated to project from the endwall portion, rotation of said pawl member being limited to about 90° by said projecting wall portion to ensure that the mounting pawl member grasps the wall in vise-like manner, said pawl mounting member requiring only a single stop for operation.

14. A wiring device according to claims 13, wherein said flange means is made from a metal and attached to the wiring device by bendable tabs without screws or rivets.

15. An electrical component for coupling to an electrical power cable and adapted to be mounted through an opening in a supporting base, said component comprising:

an enclosure having a front face and side walls depending therefrom;

a cover adapted to close said enclosure generally at its back which is opposite said front face, said cover being spaced apart from said front face by said side walls, said cover having a set of flexible legs extending from edges thereof and terminating in tabs;

said side walls having apertures therein generally adjacent said front face to receive said tabs for securing said cover to said enclosure and said front face having sides which are displaced inwardly from said side walls for exposing a portion of each said aperture to permit engagement of said apertures by guide means adapted to locate said component in a desired position in the opening of the supporting base before affixing it in place.

16. Mounting means for a self-contained electrical wiring device which includes:

a pair of flange members mounted at opposite endwall portions of the wiring device, said flange members adapted to abut a front surface of a wall member along back surface portions of said flanges, and said flange member including a first aperture accessible from the front of the device; and a tab member formed integrally with said flange and extending angularly rearwardly of said flange member, said tab member having a second aperture formed therein, such that after the wiring device is inserted in an opening formed in a wall member, a prying tool can be inserted from the front of the device through said first aperture and engages said second aperture to bend said tab member against the back of the wall member, thereby securing the wiring device to the wall member between said flange member and said tab member.

17. Mounting means according to claim 16, wherein said flange means is made fron a metal and is attached to the wiring device by bendable tabs without screws or rivets.

* * * * *